United States Patent
Nguyen et al.

(10) Patent No.: US 11,144,910 B2
(45) Date of Patent: Oct. 12, 2021

(54) SYSTEM AND METHOD FOR INSERTING DATA INTO AN INTERNET BROWSER FORM

(71) Applicant: Capital One Services, LLC, McLean, VA (US)

(72) Inventors: Vu Nguyen, Pittsburg, CA (US); David Gabriele, Chicago, IL (US); Jonatan Yucra Rodriguez, San Francisco, CA (US); Adam Vukich, Alexandria, VA (US); Abdelkader Benkreira, New York, NY (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/790,871

(22) Filed: Feb. 14, 2020

(65) Prior Publication Data
US 2021/0256503 A1    Aug. 19, 2021

(51) Int. Cl.
*G06Q 20/36* (2012.01)
*G06F 40/174* (2020.01)
(Continued)

(52) U.S. Cl.
CPC ......... *G06Q 20/363* (2013.01); *G06F 40/174* (2020.01); *G06Q 20/0855* (2013.01);
(Continued)

(58) Field of Classification Search
CPC ............. G06Q 20/363; G06Q 20/0855; G06Q 20/351; G06Q 20/3672; G06Q 20/3674; G06F 40/174
See application file for complete search history.

(56) References Cited

U.S. PATENT DOCUMENTS

2002/0083068 A1* 6/2002 Quass ................... G06F 40/174
2005/0257134 A1* 11/2005 Goodman ............. G06F 40/174
715/226

(Continued)

OTHER PUBLICATIONS

S. Wang, Y. Zou, J. Ng and T. Ng, "Automatic Filling Values to Services: A Road Map," 2015 IEEE World Congress on Services, 2015, pp. 275-277, doi: 10.1109/SERVICES.2015.48. (Year: 2015).*

(Continued)

*Primary Examiner* — Mike Anderson
*Assistant Examiner* — Bolko M Hamerski
(74) *Attorney, Agent, or Firm* — Jeffri A. Kaminski; Venable LLP

(57) ABSTRACT

Systems, methods, and computer-readable storage media for inserting payment information into payment forms without user interaction. A system can identify that a user has navigated to a web page operated by a merchant computer system for a merchant and identify a payment form within the web page. The system can then execute a payment request API which generates a query for saved payment credentials for the user from the merchant computer system. When the merchant computer system indicates it does not have the saved payment credentials for the user, the system can identify browser-saved payment credentials stored in the Internet browser, then generate a virtual payment information associated with the browser-saved payment credentials. The virtual payment information can then be inserted into corresponding fields of the payment form without the user entering any additional information.

13 Claims, 5 Drawing Sheets

(51) Int. Cl.
*G06Q 20/34* (2012.01)
*G06Q 20/08* (2012.01)
(52) U.S. Cl.
CPC ....... *G06Q 20/351* (2013.01); *G06Q 20/3672* (2013.01); *G06Q 20/3674* (2013.01)

(56) References Cited

U.S. PATENT DOCUMENTS

| | | | |
|---|---|---|---|
| 2006/0218088 A1* | 9/2006 | Flora | G06Q 20/10 705/39 |
| 2014/0123057 A1* | 5/2014 | Eigner | G06Q 30/0269 715/780 |
| 2015/0074588 A1* | 3/2015 | Swinehart | G06F 40/174 715/780 |
| 2015/0339770 A1* | 11/2015 | Keithley | G06Q 30/0641 705/38 |
| 2017/0278174 A1* | 9/2017 | Harrell | G06Q 20/401 |
| 2017/0357627 A1* | 12/2017 | Peterson | G06F 7/023 |
| 2018/0025442 A1 | 1/2018 | Isaacson et al. | |
| 2019/0087894 A1* | 3/2019 | Bloy | G06Q 20/1085 |
| 2019/0281030 A1* | 9/2019 | Isaacson | G06Q 20/40 |
| 2020/0126085 A1* | 4/2020 | Roche | G06Q 20/202 |

OTHER PUBLICATIONS

International Search Report and Written Opinion in corresponding International Application No. PCT/US2020/066425 dated Feb. 5, 2021 (18 pages).

\* cited by examiner

SYSTEM AND METHOD FOR INSERTING DATA INTO AN INTERNET BROWSER FORM

BACKGROUND

1. Technical Field

The present disclosure relates to insertion of information into a form within a web browser, and more specifically to automatically obtaining and providing private data upon an API determining that a merchant website does not have the private data saved.

2. Introduction

Technology which assists a user in typing or entering information is generally based on a computer's ability to predict what a user is typing or otherwise entering into a computer. For example, users of a search engine may be presented with suggested queries based on their previous searches and/or based on similar searches conducted by other users. As another example, a user typing a text message (e.g., a SMS message, "Short Message Service) may have words suggested based on the context of the message, the intended recipient, previous text messages received, previous text messages sent, etc.

With respect to private data, such as a user's credit card information, some Internet browsers can save a user's data, then enter the data upon receiving authorization from a user. For example, such browsers can suggest autocompletion of the respective fields with private data as the user begins entering data into the fields, with the user hitting "enter" to provide authorization for the autocompleted forms. In other instances, merchants can save a user's checkout information, such as address, credit card information, etc., and, upon receiving authorization from the user, fill in the respective fields based on the saved data. However, in both instances, the checkout process is slowed by the need to receive explicit permission from the user before entering the private data into the fields.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media a technical solution to the technical problem described. A method for performing the concepts disclosed herein can include: identifying, via a processor operating an Internet browser, that a user has navigated to a web page operated by a merchant computer system for a merchant; identifying, via the processor, a payment form within the web page; executing, via the processor, a payment request application programming interface (API), the payment request API having executable code distinct from the Internet browser, the payment request API generating a query for saved payment credentials for the user from the merchant computer system; receiving, from the merchant computer system in response to the query, an indication that the merchant computer system does not have the saved payment credentials for the user; upon receiving the indication, identifying, via the processor, browser-saved payment credentials stored in the Internet browser; generating, via the processor, a virtual payment information associated with the browser-saved payment credentials; and inserting, via the processor, the virtual payment information into corresponding fields of the payment form without the user entering any information into any of the corresponding fields.

A system configured to perform the concepts disclosed herein can include: a processor; and a non-transitory computer-readable storage medium having instructions stored which, when executable by the processor, cause the processor to perform operations comprising: identifying that a web browser operated by a user has downloaded a merchant web page operated by a merchant; identifying, by matching field names within the merchant web page, a payment form within the merchant web page; initiating a payment application programming interface (API), the payment API having executable code distinct from the web browser, the payment API querying the merchant for saved credit card information associated with the user; receiving, from the merchant, a notification that the merchant does not have the saved credit card information for the user; upon receiving the notification, retrieving stored credit card information saved in the web browser; inserting stored credit card information into fields of the payment form prior to the user entering any information into any respective field of the payment form.

A non-transitory computer-readable storage medium configured as disclosed herein can have instructions stored which, when executed by a computing device, cause the computing device to perform operations which include: identifying a payment form within a webpage being viewed, through a browser, by a user; and upon identifying the payment form, executing a payment application programming interface (API), the payment API having executable code distinct than that of the browser, the payment API performing operations comprising: transmitting a query to an operator of the webpage, the query requesting payment information associated with the user; receiving, from the operator in response to the query, a notification that the operator does not have the payment information associated with the user; retrieving stored payment information within the browser; transmitting, to a third party, the stored payment information; receiving, from the third party, a virtual credit card information associated with the stored payment information; and inserting the virtual credit card information into the payment form before the user manually enters any payment information into the payment form.

DETAILED DESCRIPTION

Figure 1:
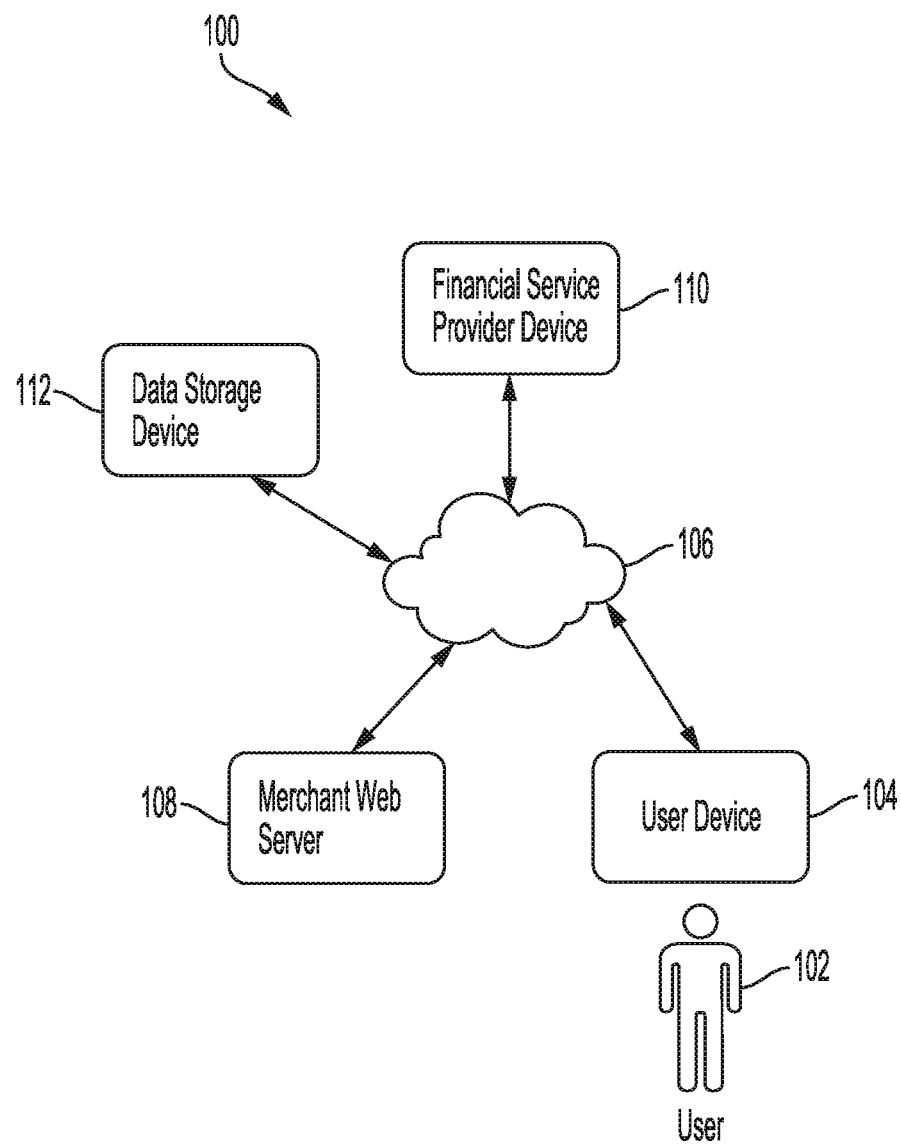
FIG. 1 illustrates an example system embodiment.

Various embodiments of the disclosure are described in detail below. While specific implementations are described, it should be understood that this is done for illustration purposes only. Other components and configurations may be used without parting from the spirit and scope of the disclosure.

The present disclosure addresses obtaining and entering of private data into fields within an Internet browser. In one example, the methods and systems allow a program or application ("app") to insert private information not stored within that program or app, and to then use that information. Account controls may be provided which allow for control of which information may be accessed. Whereas previous systems required explicit permission from the user to enter stored private data, the methods, systems, and computer-readable media disclosed herein can, upon following specific rules and requirements, directly enter the private information into the corresponding fields of the Internet browser without the need for explicit permission from the user. By automatically entering private information of a user automatically obtained into the corresponding fields, the process of completing the form is increased.

As described herein, private data can be any form of controlled user data. Examples of private data can include identification information, such as social security numbers, addresses, date of birth, phone numbers, email addresses, social media handles, names of family members (and associated identification information), credit card information, bank account information, login/password information, etc. In some instances, private data may be publicly available (such as an email address), however it may not be desirable to share that information at all times, in which case it would default to private data.

Consider the following example. A user is browsing the Internet using an Internet browser, such as CHROME, FIREFOX, INTERNET EXPLORER, etc. As the user browses a merchant's website, the user decides to make a purchase. The merchant's website, upon receiving from the user an indication to make the purchase, illustrates a payment form with various fields for the user's credit card number, name, address, etc. A browser extension, executes an API (Application Programming Interface), which sends a query to the merchant's website. The query includes a request for payment information. The payment information may be, for example, information which the user had previously used and which was previously saved by the merchant. In this example, the merchant's website responds by indicating that it does not have the user's payment information stored. In response to this, the browser extension (or the browser) identifies payment information stored within the browser, retrieves that information, and fills the payment form fields with the corresponding payment information. The filling of the payment form fields with the stored payment information occurs without the user entering any information into the corresponding fields, and without the user otherwise giving permission to the browser extension to do so.

The code executing the browser extension can be separate, distinct code than the browser code, but configured to operate with the browser code. In other configurations, the browser extension code can be a specific portion or part of the browser code which can be enabled, or disabled, by the user.

In some configurations, rather than the filling of the fields without the user entering any information, the system can be configured to automatically enter the private data only once the user enters a predetermined amount of data perfectly corresponding to the saved private data. For example, stored credit card information can be entered automatically (without user confirmation) once the user enters the first four digits of the credit card information.

In some configurations, rather than inserting saved private data, such as payment information saved within the browser, the system can instead generate virtual payment information associated with saved payment credentials. For example, upon receiving a notification that the merchant site does not have saved payment credentials from the user, and/or upon determining that the user has entered a minimum amount of the saved data, the system can generate a virtual credit card number (or other payment authorization code). The virtual credit card number is a valid credit card number which is not associated with any physical card.

This virtual credit card number can then be entered into the browser fields in place of the saved payment information. In some configurations, generation of the virtual credit card number can occur at a third party computing system/server. For example, the browser/browser extension (or the processor executing the browser code) can request that a third party server generate the virtual credit card number, then forward the virtual credit card number to the browser/browser extension for entry. In certain configurations, the browser and/or the third party server can generate distinct virtual credit card numbers for respective merchants. Having distinct virtual credit card numbers for respective merchants can reduce fraud because when a user's virtual credit card number associated with a first merchant is being used with a second merchant, the system can automatically flag the account as compromised and cancel the number. Having virtual credit card numbers associated with a specific merchant also reduces the amount of time needed to identify fraud and reduce/eliminate any potential ramifications of that fraud.

With that basis, the disclosure turns to the examples provided in the illustrations. FIG. 1 illustrates an example system embodiment 100. As illustrated, a user 102 is interacting with a user device 104. The user device 104 can communicate over a network 106, such as the Internet, with a merchant website server 108, a service provider device 110, and a data storage device 112. As an example, the user 102, using the user device 104, can navigate a web browser to a webpage operate by the merchant web server 108. The user 102 can select an option to make a purchase from the merchant website, and the web browser on the user device 104 can request, from the merchant web server 108, if the merchant web server 108 has any stored payment credentials associated with the user 102 or the user device 104. If the merchant web server 108 replies that it does not have any payment credentials stored, the user device 104 can determine if it has any payment credentials stored within the device 104. For example, the user device 104 may have the payment credentials stored within computer-readable memory. Alternatively, the user device 104 may communicate with a data storage device 112 across the network 106, querying the data storage device 112 for stored payment credentials.

When stored payment credentials are identified, the service provider device 110, which can, for example, be a server operated by a services company, can generate a virtual credit card number (or other virtual/non-physical payment account) associated with the stored payment information. The service provider device 110 can then provide that virtual payment information to the user device 104, which can automatically load the virtual payment information directly into payment forms associated with the purchase process for the product.

Figure 2:
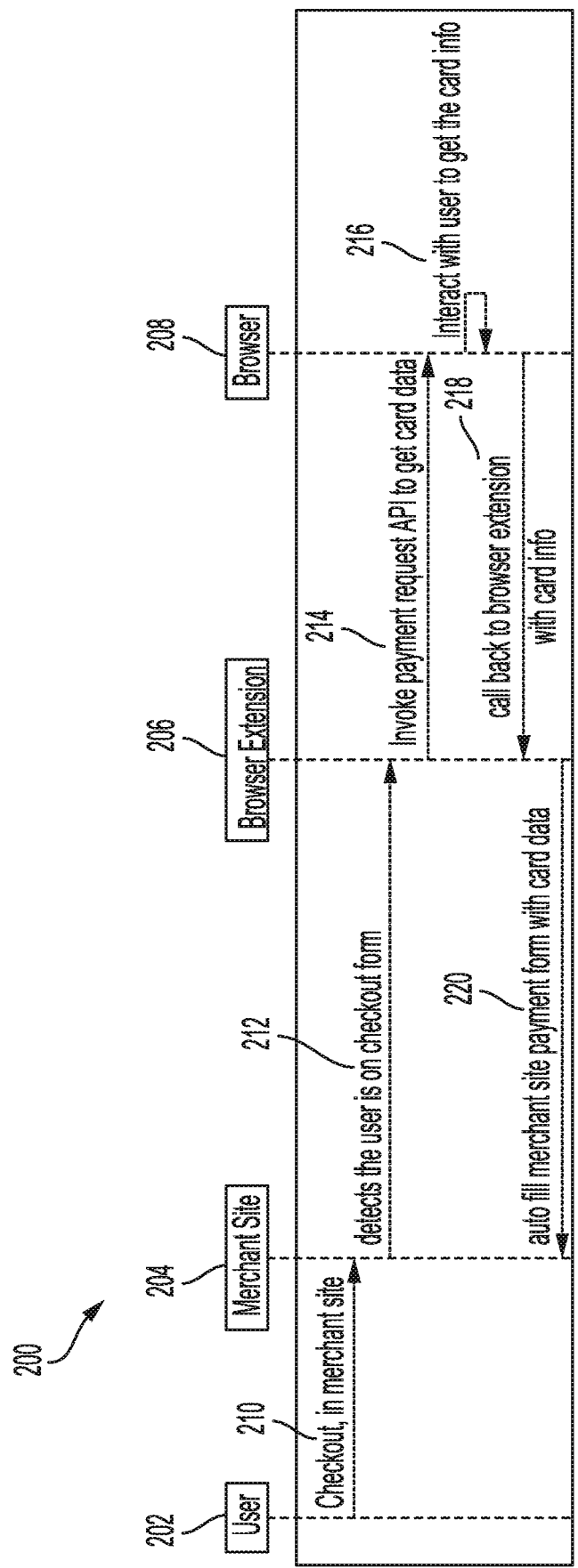
FIG. 2 illustrates a prior art example of communications between a user, a merchant site, a browser, and a browser extension.

FIG. 2 illustrates a prior art example of communications 200 between a user 202, a merchant site 204, a browser 208, and a browser extension 206. While illustrated as distinct, in some configurations the browser extension 206 can be built into the browser 208 code as a unique portion of the browser code which can be enabled or disabled. In this example 200, the user 202 seeks to checkout 210 within the merchant site 204. The processor, configured as disclosed herein, detects that the user 202 is on the checkout form 212. This may be done automatically. Once the payment form is detected, the browser extension invokes a payment request API (Application Programming Interface) 214 to obtain previously stored credit card data. In this example, the user interacts 216 with the browser 208 to provide the payment information, which is then returned 218 from the browser 208 to the browser extension 206. At that point, the system can automatically enter credit card data 220 into the corresponding fields of the merchant site payment form.

Figure 3:
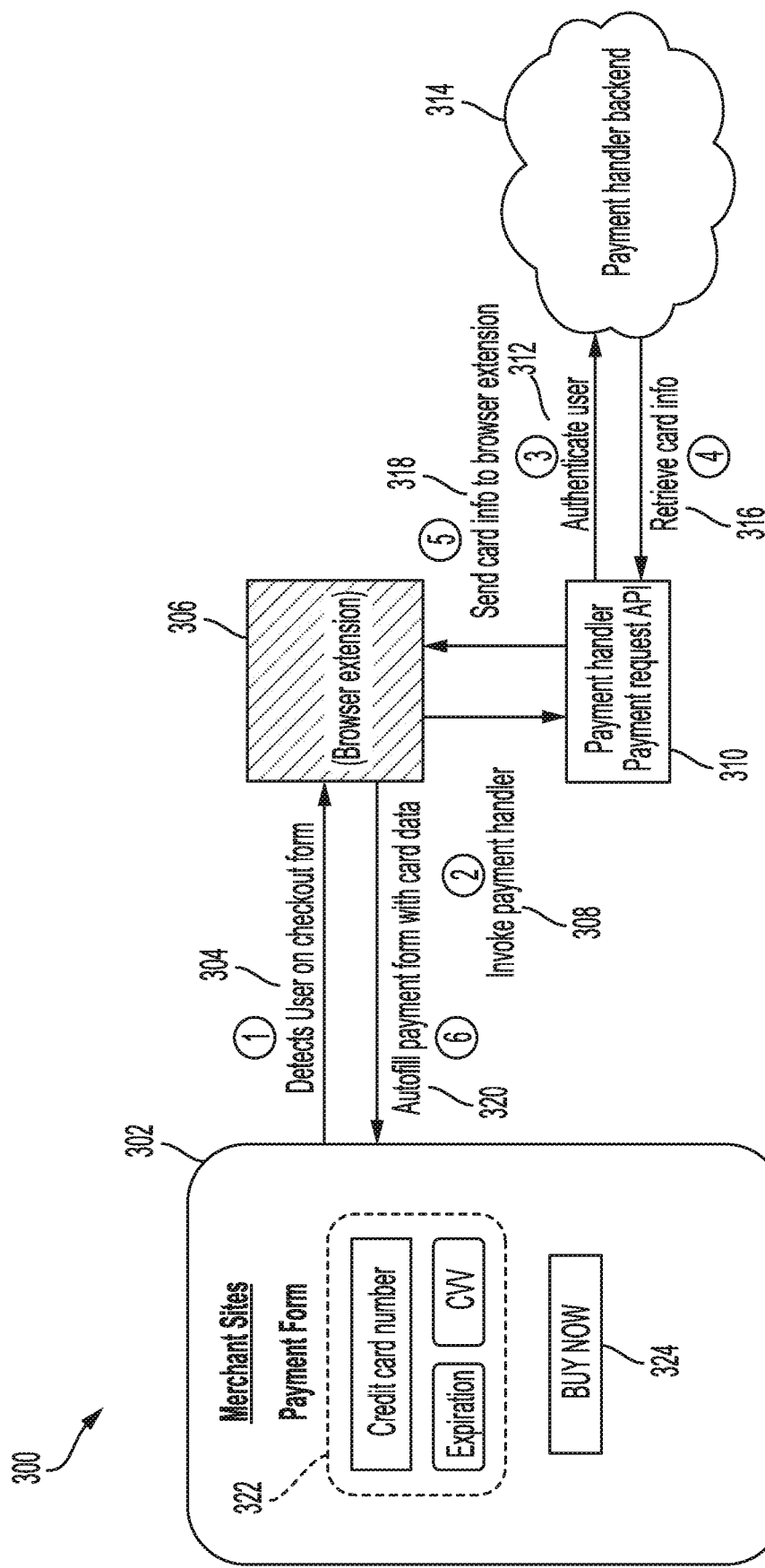
FIG. 3 illustrates example communications between a browser extension, a merchant site, and a payment handler backend as disclosed herein.

By contrast, FIG. 3 illustrates example communications 300 between a browser extension 306, a merchant site 302, and a payment handler backend 314 as disclosed herein. Rather than needing user interaction, the illustrated communications can fill a payment form 322 without any direct user interaction once the user browses to a merchant site 302. Once a processor, configured as disclosed herein, detects that the user is on a checkout form 304, a browser extension 306, having code which is distinct from a browser, sends a payment handler request 308 to a payment handler/payment request API 310. The payment hander 310, in this example, authenticates the user 312 by communicating with the payment handler backend 314. In some configurations, an authentication of an identity of the user by the payment handler backend 314 may have already occurred, and this authentication 312 is exclusively associated with previously stored payment information of the user.

The payment handler backend 314 responds to the authentication request 312 with the previously stored card information 316, which the payment hander 310 returns 318 to the browser extension 306. The browser extension 306 then automatically enters 320 the payment form 322 on the merchant website 302, such that the user sees an already-filled payment form. At that point, the user only needs to confirm the purchase by selecting the "Buy Now" button 324.

Figure 4:
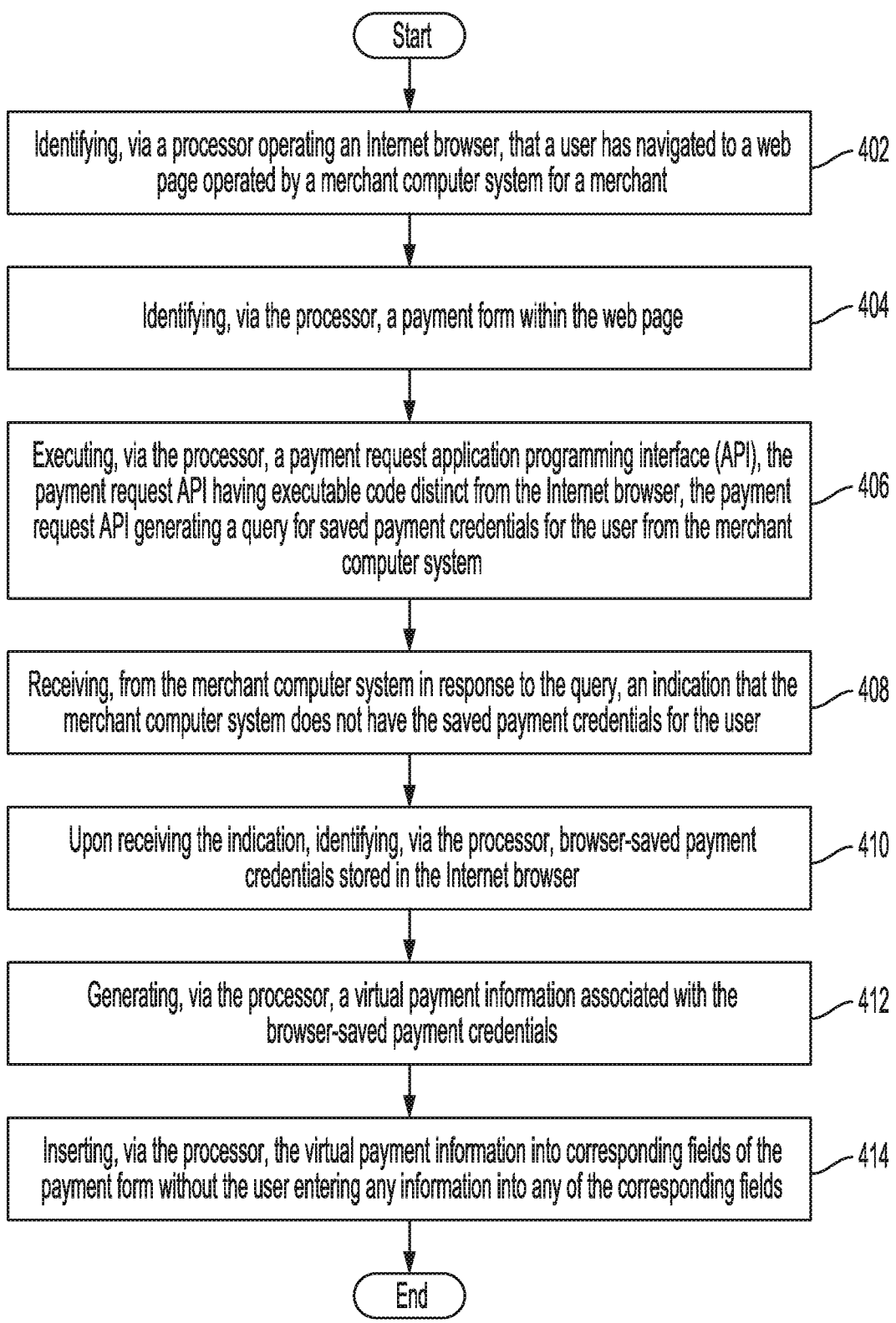
FIG. 4 illustrates an example method embodiment.

FIG. 4 illustrates an example method embodiment. In this example, the method is performed by a system (such as a computing device with a processor) operating an Internet browser. The processor identifies that a user has navigated to a web page operated by a merchant computer system for a merchant (402). This recognition can occur based on a comparison of known websites to the current website, based on a designation of the website (e.g., ".com"), or in other known ways of website detection. The processor identifies a payment form within the web page (404). This identification can occur, for example, by the processor performing a text comparison on text loaded into the webpage, searching for terms such as "credit card number" and "expiration date." In applications associated with private, non-payment information, the form may be looking for "social security number" or "date of birth."

The system executes, via the processor, a payment request application programming interface (API), the payment request API having executable code distinct from the Internet browser, the payment request API generating a query for saved payment credentials for the user from the merchant computer system (406). The system receives, from the merchant computer system in response to the query, an indication that the merchant computer system does not have the saved payment credentials for the user (408) and, upon receiving the indication, identifies, via the processor, browser-saved payment credentials stored in the Internet browser (410). The system generates, via the processor, a virtual payment information associated with the browser-saved payment credentials (412) and inserts, via the processor, the virtual payment information into corresponding fields of the payment form without the user entering any information into any of the corresponding fields (414).

In some configurations, the system can tokenize, via the processor, the virtual payment information, resulting in tokenized card data, where the virtual payment information inserted into the corresponding fields of the payment form is the tokenized card data.

In some configurations, the insertion of the virtual payment information into the corresponding fields of the payment form occurs prior to the user scrolling, within the Internet browser, to the payment form of the web page. That is, the processor detects that there is a portion of the webpage which contains a payment form, that portion is not yet displayed on the screen, and the processor executes the steps of the illustrated method prior to the user scrolling to that portion of the webpage.

In some configurations, the browser-saved payment information can include credit card data stored by the browser, where the virtual payment information is generated specifically for the merchant.

In some configurations, the insertion of the virtual payment information does not occur until the user enters a minimum amount of identifying information. For example, the user may need to enter the first three digits of their credit card information before any portion of the stored credit card information appears. Likewise, the user may need to provide a minimum amount of confirmation information prior to virtual credit card information being inserted. Non-limiting examples of the minimum amount of identifying information can include a predetermined number of digits from the browser-saved payment credentials, an identification and a password, and/or a biometric identification.

In some configurations, the executing of the payment request API by the processor is initiated by the user interacting with a portion of a graphical user interface (GUI) of the Internet browser.

In some configurations, the illustrated method can further include: transmitting, through the Internet browser, the payment form with the corresponding fields filled with the virtual payment information. That is, the method can include transmitting the completed form to the merchant.

In some configurations, the illustrated method can be augmented to include: receiving, prior to the generation of the virtual payment information, a remaining portion of the payment information from the user, where the virtual payment information is further associated with the remaining portion.

In some configurations the virtual payment information comprises a virtual credit card number. In such configurations, the payment request API can further request the saved payment credentials from a third party database, where, upon inserting the virtual payment information into the corresponding fields, the payment request API stores the virtual payment information in the third party database.

Figure 5:
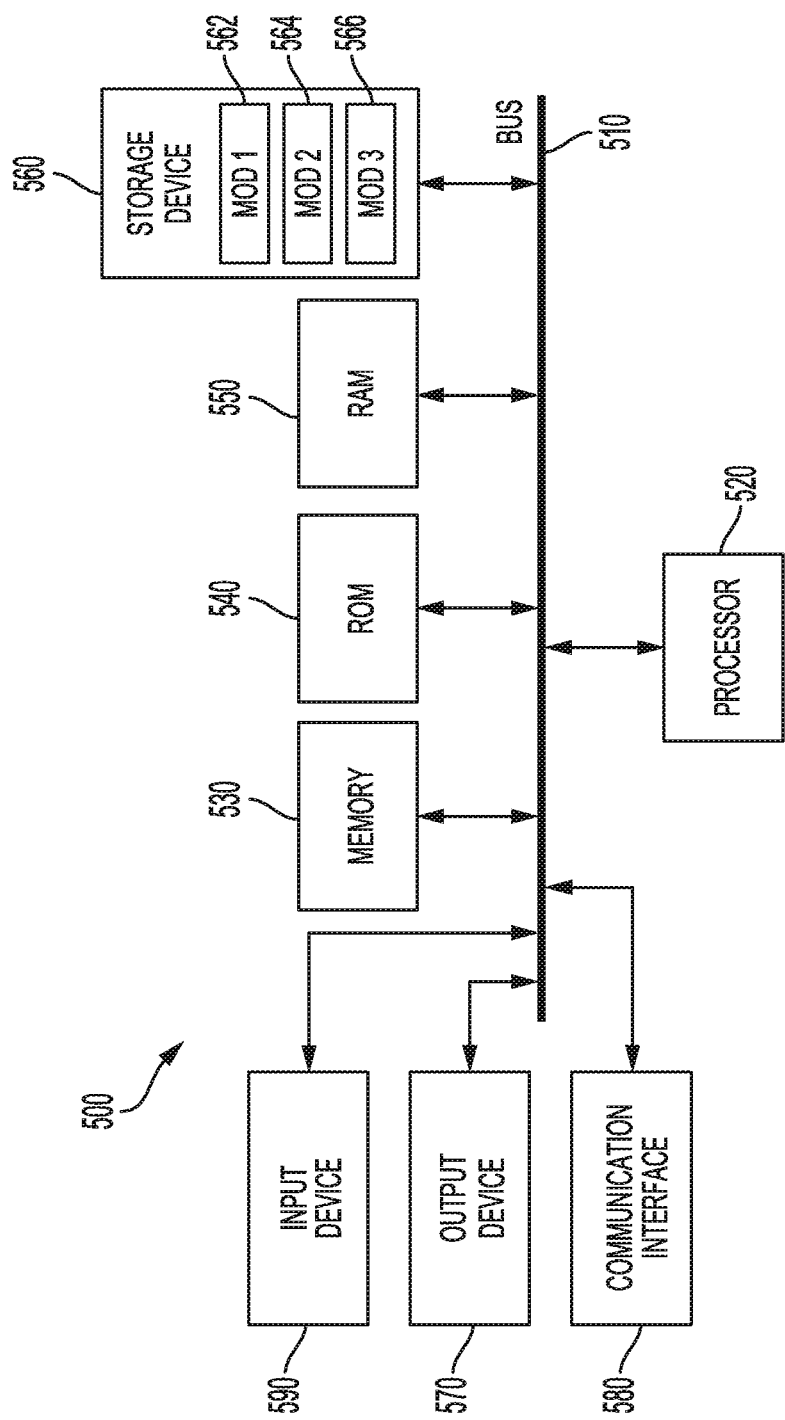
FIG. 5 illustrates an example computer system.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:

identifying, via a processor operating an Internet browser, that a user has navigated to a web page operated by a merchant computer system for a merchant;

identifying, via the processor, a payment form within the web page;

executing, via the processor, a payment request application programming interface (API), the payment request API having executable code distinct from the Internet browser, the payment request API generating a query for saved payment credentials for the user from the merchant computer system;

receiving, from the merchant computer system in response to the query, an indication that the merchant computer system does not have the saved payment credentials for the user;

upon receiving the indication, identifying, via the processor, browser-saved payment credentials stored in the Internet browser;

generating, via the processor, a virtual payment information associated with the browser-saved payment credentials, the virtual payment information being distinct from the browser-saved payment credentials;

tokenizing, via the processor, the virtual payment information, resulting in tokenized virtual card payment information; and inserting, via the processor, the tokenized virtual payment information into corresponding fields of the payment form without the user entering any information into any of the corresponding fields, wherein the insertion of the tokenized virtual payment information does not occur until the user enters a minimum amount of biometric information, and wherein the insertion of the tokenized virtual payment information into the corresponding fields of the payment form occurs prior to the user scrolling, within the Internet browser, to the payment form of the web page.

2. The method of claim 1, wherein:

the browser-saved payment credentials comprise credit card data stored by the Internet browser; and wherein the virtual payment information is generated specifically for the merchant.

3. The method of claim 1, wherein the insertion of the tokenized virtual payment information does not occur until the user enters a minimum amount of at least one of a predetermined number of digits from the browser-saved payment credentials and an identification with a password.

4. The method of claim 1, wherein the executing of the payment request API by the processor is initiated by the user interacting with a portion of a graphical user interface (GUI) of the Internet browser.

5. The method of claim 1, further comprising:

transmitting, through the Internet browser, the payment form with the corresponding fields filled with the virtual payment information.

6. The method of claim 1, further comprising:

receiving, prior to the generation of the virtual payment information, a remaining portion of the browser-saved payment credentials from the user, wherein the virtual payment information is further associated with the remaining portion.

7. The method of claim 1, wherein the virtual payment information comprises a virtual credit card number.

8. The method of claim 7, wherein the payment request API further requests the saved payment credentials from a third party database; and wherein, upon inserting the virtual payment information into the corresponding fields, the payment request API stores the virtual payment information in the third party database.

9. A system, comprising:

a processor; and a non-transitory computer-readable storage medium having instructions stored which, when executable by the processor, cause the processor to perform operations comprising:

identifying that a web browser operated by a user has downloaded a merchant web page operated by a merchant;

identifying, by matching field names within the merchant web page, a payment form within the merchant web page;

initiating a payment application programming interface (API), the payment API having executable code distinct from the web browser, the payment API querying the merchant for saved credit card information associated with the user;

receiving, from the merchant, a notification that the merchant does not have the saved credit card information for the user;

upon receiving the notification, retrieving stored credit card information saved in the web browser;

generating virtual payment information associated with the stored credit card information, the virtual payment information being distinct from the stored credit card information;

tokenizing the virtual payment information, resulting in tokenized virtual card payment information;

inserting the tokenized virtual payment information into fields of the payment form prior to the user entering any information into any respective field of the payment form and prior to the user scrolling, within the web browser, to the payment form of the merchant web page, wherein the insertion of the tokenized virtual payment information does not occur until the user enters a minimum amount of biometric information.

10. The system of claim 9, wherein the insertion of the tokenized virtual payment information does not occur until the user enters a minimum amount of at least one of a predetermined number of digits from browser-saved payment credentials and an identification with a password.

11. The system of claim 9, wherein the initiating of the payment API occurs upon the user interacting with a graphic displayed by a graphical user interface (GUI) of the web browser.

12. The system of claim 9, wherein the payment API further searches for the saved credit card information in a third party database; and wherein, upon inserting the virtual payment information into the fields, the payment API stores the saved credit card information in the third party database.

13. A non-transitory computer-readable storage medium having instructions stored which, when executed by a computing device, cause the computing device to perform operations comprising:

identifying a payment form within a web page being viewed, through a browser, by a user; and upon identifying the payment form, executing a payment application programming interface (API), the payment API having executable code distinct from that of the browser, the payment API performing operations comprising:

transmitting a query to an operator of the web page, the query requesting payment information associated with the user;

receiving, from the operator in response to the query, a notification that the operator does not have the payment information associated with the user;

retrieving stored payment information within the browser;

transmitting, to a third party, the stored payment information;

receiving, from the third party, a virtual credit card information associated with the stored payment information, the virtual credit card information being distinct from the stored payment information;

tokenizing the virtual credit card information, resulting in tokenized virtual credit card information; and after receiving a minimum amount of biometric information from the user, inserting the tokenized virtual credit card information into the payment form before the user manually enters any payment information into the payment form and prior to the user scrolling, within the browser, to the payment form of the web page.

* * * * *